(12) United States Patent
Magal

(10) Patent No.: US 7,597,440 B1
(45) Date of Patent: Oct. 6, 2009

(54) EYEGLASS FRAME WITH SLIDABLE FEATURE

(76) Inventor: Geoff Magal, 64-35 Yellowstone Blvd., Apt. 5H, Forest Hills, NY (US) 11375

( * ) Notice: Subject to any disclaimer, the term of this patent is extended or adjusted under 35 U.S.C. 154(b) by 0 days.

(21) Appl. No.: 12/015,802

(22) Filed: Jan. 17, 2008

(51) Int. Cl.
*G02C 11/02* (2006.01)

(52) U.S. Cl. .......................................... 351/51; 351/52

(58) Field of Classification Search ................... 351/41, 351/51, 52, 158
See application file for complete search history.

(56) References Cited

U.S. PATENT DOCUMENTS

| | | |
|---|---|---|
| D191,887 S | 12/1961 | Braunhut |
| D335,679 S | 5/1993 | Jones et al. |
| D384,683 S | 10/1997 | Martinant de Preneuf |
| 5,825,453 A * | 10/1998 | Baragar et al. .............. 351/137 |
| D401,957 S | 12/1998 | Wu |
| D410,938 S | 6/1999 | Zimmerman |
| D418,855 S | 1/2000 | Grimaldi |
| D424,092 S | 5/2000 | Wang |
| D426,846 S | 6/2000 | Jung |
| D428,620 S | 7/2000 | Maturaporn |
| D434,059 S | 11/2000 | Wang |
| D439,924 S | 4/2001 | Brown |
| D483,790 S | 12/2003 | Peng |
| 7,484,842 B2 * | 2/2009 | Brzozowski ................. 351/41 |
| 2008/0316420 A1 * | 12/2008 | Agazarova ................... 351/41 |

FOREIGN PATENT DOCUMENTS

FR    2 605 422    *   4/1988   .................. 351/52

OTHER PUBLICATIONS

Website page downloaded from http://www.houseofchuckles.com/eyeglasses-eyeballs.htm on Oct. 10, 2007.

* cited by examiner

*Primary Examiner*—Huy K Mai
(74) *Attorney, Agent, or Firm*—Myers Wolin, LLC

(57) ABSTRACT

A frame for eyeglasses includes a rim portion, a track provided on at least a portion of the rim portion and a sliding element movable on the track. The track preferably has the appearance of a zipper and the sliding element is preferably a zipper slide movable on the zipper track. Openings are provided in the track for fixing the position of the zipper slide relative to the track.

18 Claims, 12 Drawing Sheets

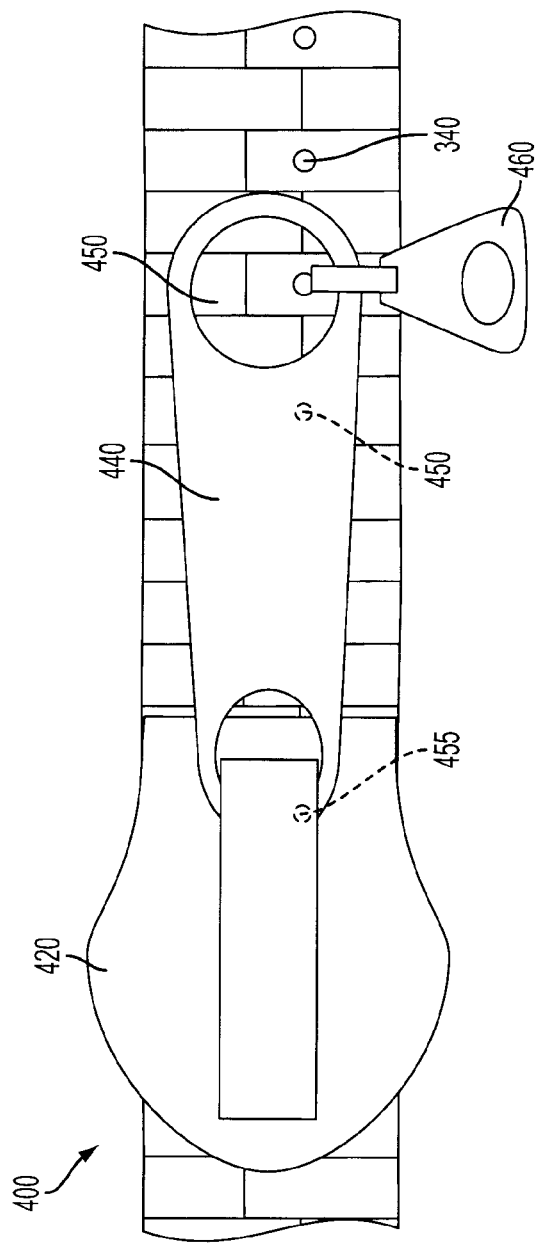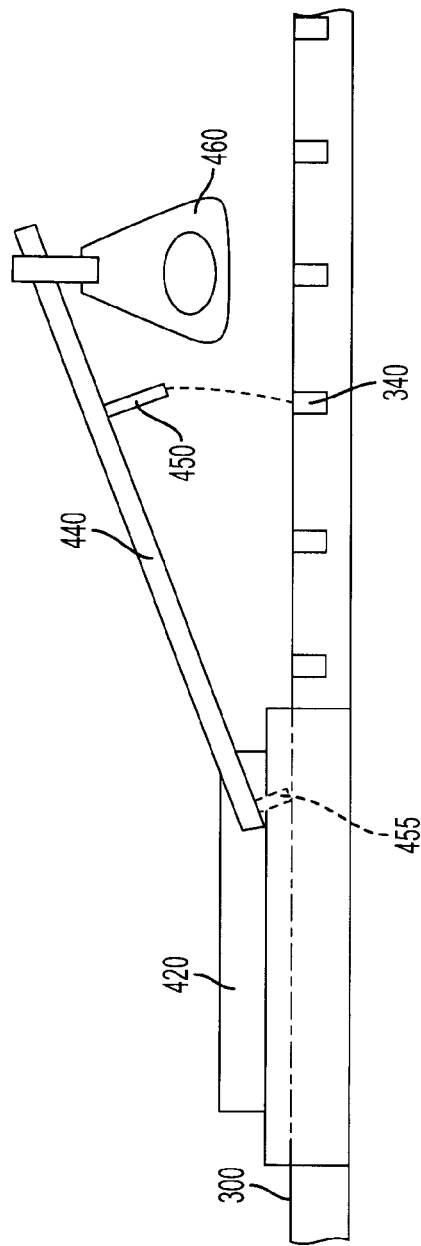
FIG. 10A
FIG. 10B

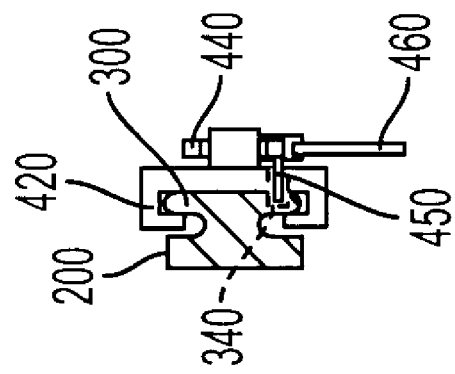
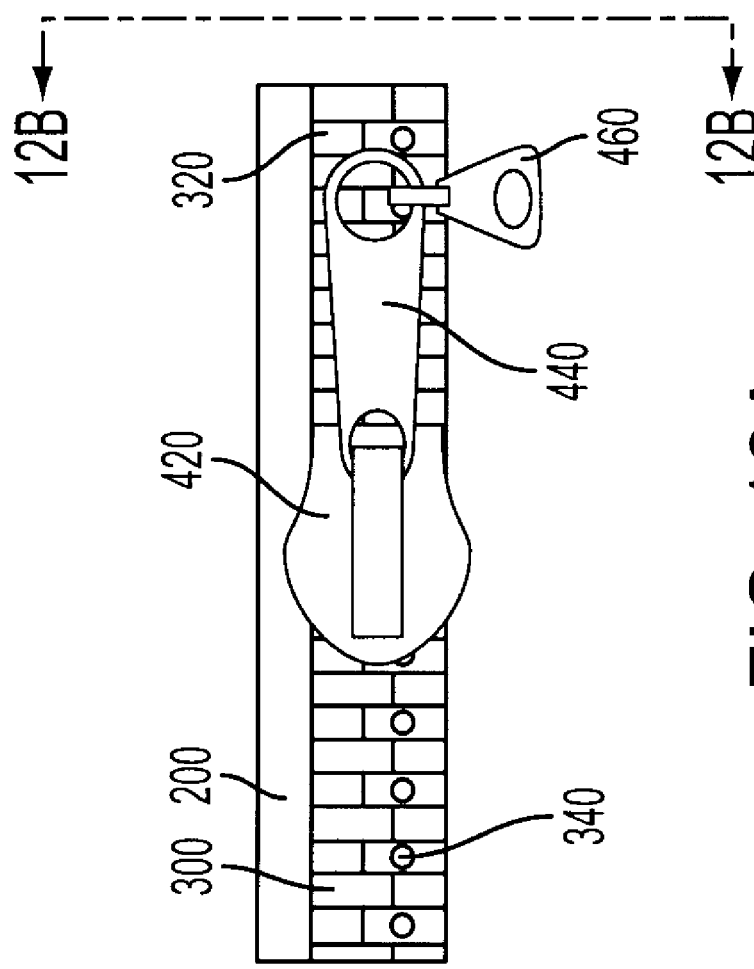

EYEGLASS FRAME WITH SLIDABLE FEATURE

FIELD OF THE INVENTION

The present invention relates to eye glasses in general and more particularly to eye glasses or sunglasses with a sliding feature.

BACKGROUND

Frames for eye glasses, sunglasses and the like come in a variety of styles, shapes, sizes, thicknesses, colors, textures, etc. While frames are generally functional for supporting the lens and support arms, they also function as fashion statements, and can be adorned with a variety of objects such as beads, stones, gemstones, and the like. Such adornments tend to be static and incapable of movement or alteration.

SUMMARY

A frame for eyeglasses comprises a rim portion, a track provided on at least a portion of the rim portion and a sliding element movable on the track. The track preferably has the appearance of a zipper and the sliding element is preferably a zipper slide movable on the zipper track. Openings are provided in the track for fixing the position of the zipper slide relative to the track.

BRIEF DESCRIPTION OF THE DRAWINGS

FIG. 10A is an isolated view of one embodiment of a zipper element of the present invention.

FIG. 10B is a side view of one embodiment of a zipper element of the present invention situated on a track.

FIG. 12A is a close up view of a portion of an eyeglass frame in accordance with one embodiment of the present invention.

FIG. 12B is a section taken through lines 12B-12B in FIG. 12A.

DETAILED DESCRIPTION OF THE PREFERRED EMBODIMENTS

Figure 1:
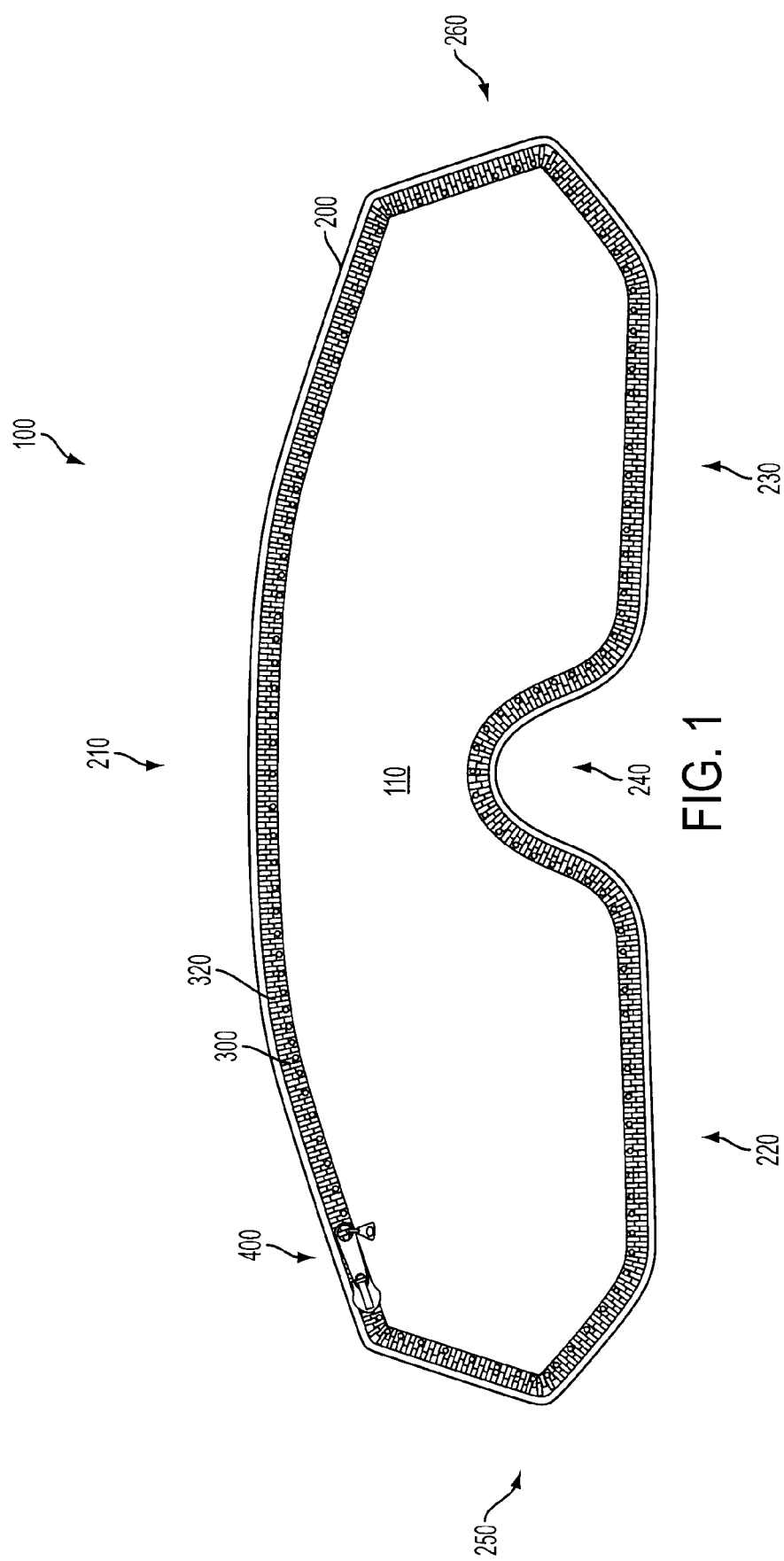
FIG. 1 is a portion of an eyeglass frame in accordance with one embodiment of the present invention.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 is a front view of one embodiment of a frame 100 for eyeglasses, sunglasses or the like. Frame 100 is typically connected to arms (not shown) that extend past a user's ears for retaining the glasses on a user's head as is known in the art, and as such, such arms will not be shown or described herein. While FIG. 1 and the remaining figures are illustrative of a pair of visor-type sunglasses having a unified lens 110, it will be appreciated and understood that the invention is applicable to any type of glasses including, but not limited to, sun glasses, prescription glasses, glasses with two or more lenses, novelty glasses, bifocals, visors, headband visors, racing glasses, helmets, face masks for underwater use, ski masks and goggles, welding visors and masks, pilots glasses, etc., having any frame style, shape, size, thickness, color, texture, etc. For purposes of convenience, the sunglasses-type shaped frame 100 of FIG. 1 will be used to explain the inventive concepts herein.

Returning to FIG. 1, frame 100 further comprises a rim portion 200 extending around the periphery of the frame 100. The rim portion 200 is preferably a retaining structure that holds the lens 110 and is separate from the lens 110. However, it will be understood that the rim portion could also comprise the outer edges of the lens 110 as with so-called rimless frames. For purposes of convenience, the rim portion 200 will be described as a structure that is separate from the lens 110.

Figure 11:
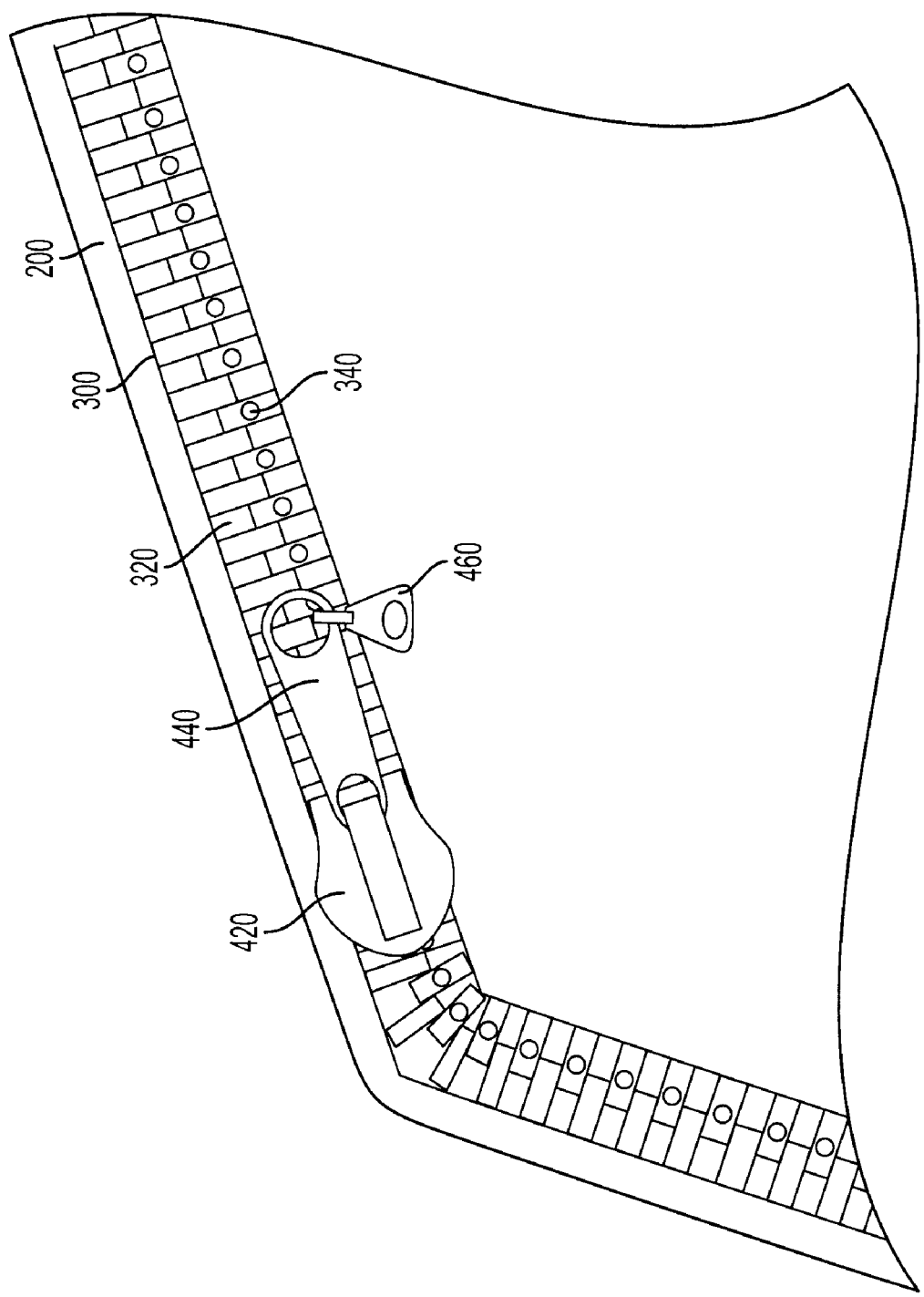
FIG. 11 is a top view of a portion of a frame in accordance with one embodiment of the present invention.

The embodiment of frame 100 illustrated in FIG. 1 further comprises a track 300 preferably provided on the rim portion 200, which preferably has the appearance of a zipper feature with interlocking zipper teeth 320. While this disclosure illustrates a zipper feature for purposes of convenience, it will be understood to one skilled in the art that other design features are contemplated. In one embodiment, the track 300 is a structural extension of the rim portion 200 as shown in FIG. 12B, and the zipper teeth feature is welded onto the track 300, or is applied to the track 300 as a sticker, overlay, or the like, or is screened onto or molded into the track 300 using known manufacturing methods. Other methods of fabricating a zipper track are contemplated. Slidably mounted on the track 300 is a sliding element 400 preferably in the form of a zipper pull having a zipper slide 420, a pull tab 440 with an opening 450, and a dangle 460 secured to the opening 450 (FIGS. 11, 12A). The zipper slide 420 extends around the track 300 as shown in FIG. 12B and slides along the longitudinal axis of track 300. The sliding element 400 is preferably not removable from the track 300 in the normal course, but is secured about the track 300 during the assembly of the frame 100. Alternatively, the sliding element 400 may be removably snap attached to the track 300 if it is desired to modify the appearance of the sliding element 400 with a particular outfit or accessory, for example, or if it is desired to repair or replace the sliding element 400 or a portion thereof as desired. The zipper teeth 320 are preferably non-functional, and do not separate and/or interlock with the movement of the zipper slide 420.

The track 300 further comprises at least one opening 340 (FIGS. 10B-12), and more preferably a plurality of spaced-apart openings 340, that receive a pin 450 (FIG. 10B) extending from the sliding element 400, and more preferably the pull tab 440, for temporarily securing the position of the sliding element 400 relative to the track 300 (see FIGS. 10B-12B). The engagement of the pin 450 with an opening 340 is preferably a press-fit engagement, although other types of engagement are contemplated. The openings 340 are preferably spaced about one quarter of an inch apart, although other spacing is contemplated. The pull tab 400 preferably comprises an additional pin 455 (FIG. 10B) that is shorter than pin 450 for additional engagement with the zipper teeth 320 through the zipper slide 420 when the pull tab 440 is secured against the track 300.

When the pull tab 440 is placed against the track 300, the pin 450 engages with an opening 340 provided in the track 300, while the smaller pin 455 engages with the threading in the zipper teeth 320 to provide additional resistance to movement. To secure the sliding element 400 to the track 300, a user simply aligns pin 450 with an opening 340 and presses the pull tab 440 against the track 300 until the pin 450 is secured within the opening 340. At the same time, the pin 455 engages with zipper teeth 320 for additional fixation. To move the sliding element 400 to another location along the track 300, a user simply lifts the pull tab 440 to release the pin 450 from an opening 340, possibly using the dangle 460 for additional pulling leverage, and then slides the sliding element 400 along the track 300 to another desired position, at which point the user re-engages the pull tab 440 with the track 300 via the pin 450 as described above.

In the embodiment of FIG. 1, the track 300 is situated around the entire periphery of the rim portion 200, which generally comprises an upper portion 210, a first lower portion 220, a second lower portion 230, a bridge portion 240, a first side portion 250 and a second side portion 260 opposite the first side portion 250. Thus, it is possible to move the sliding element 400 to a variety of different positions along the track 300.

Figure 2:
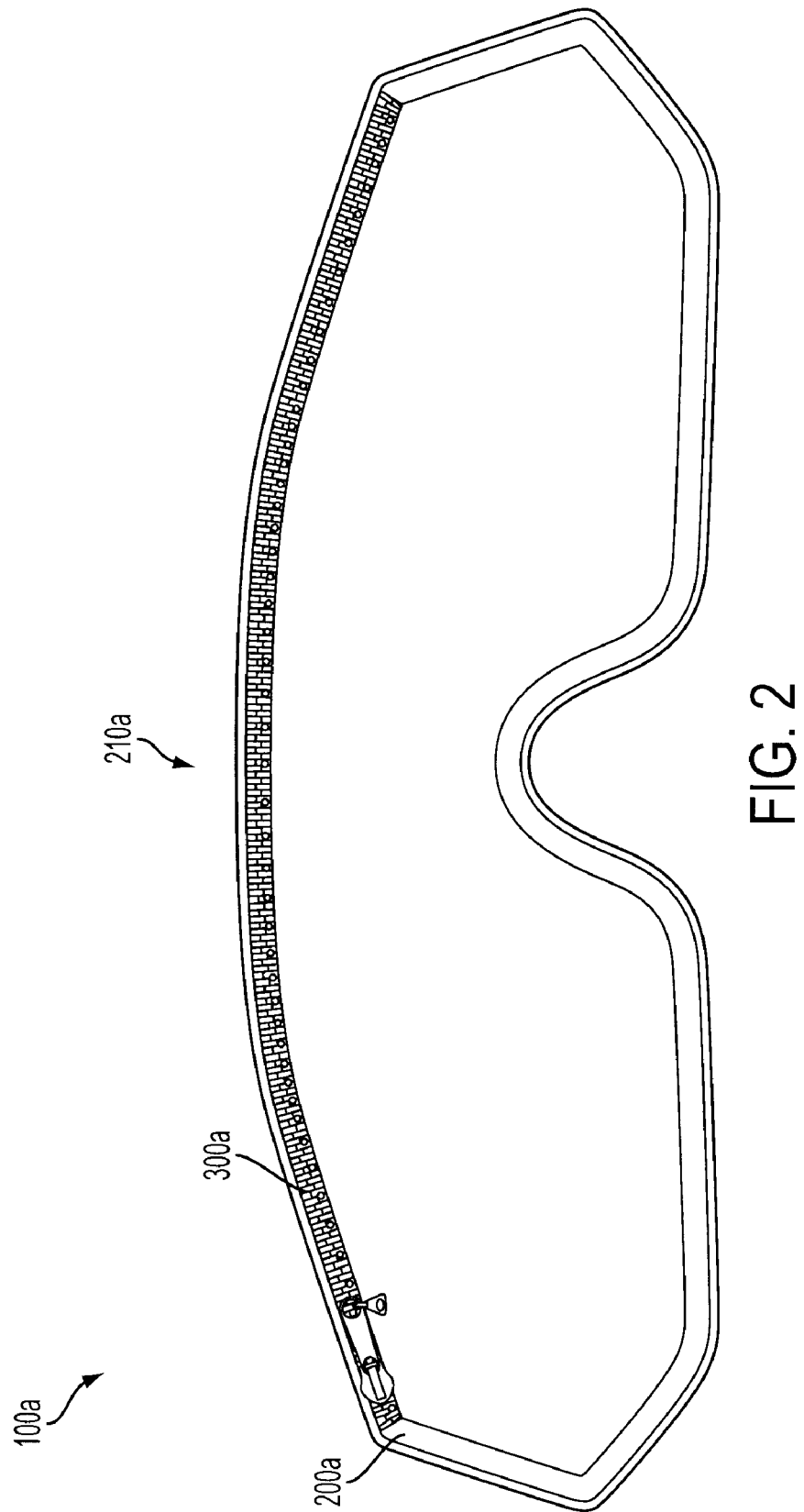
FIGS. 2-9 are alternative embodiments of a portion of an eyeglass frame in accordance with the present invention.
Figure 3:
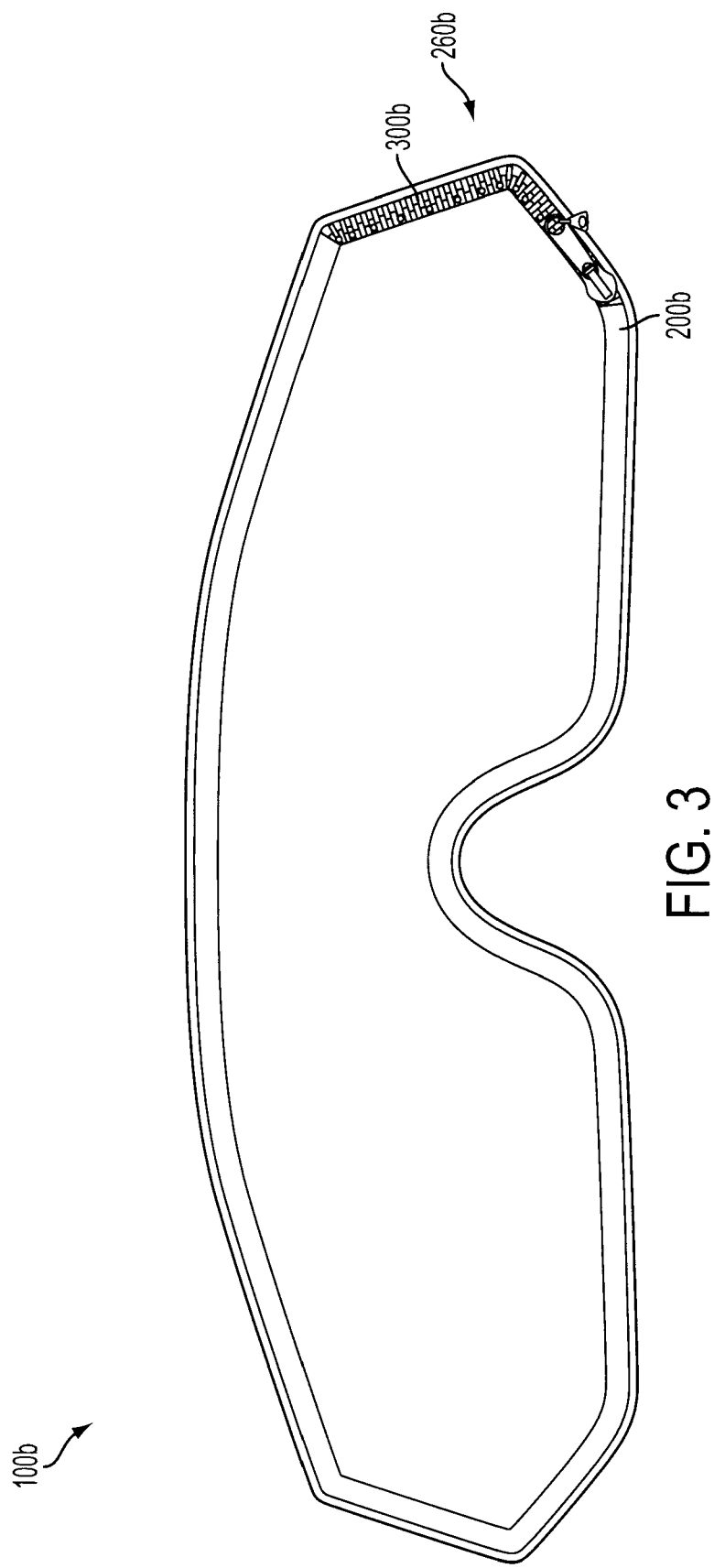
Figure 4:
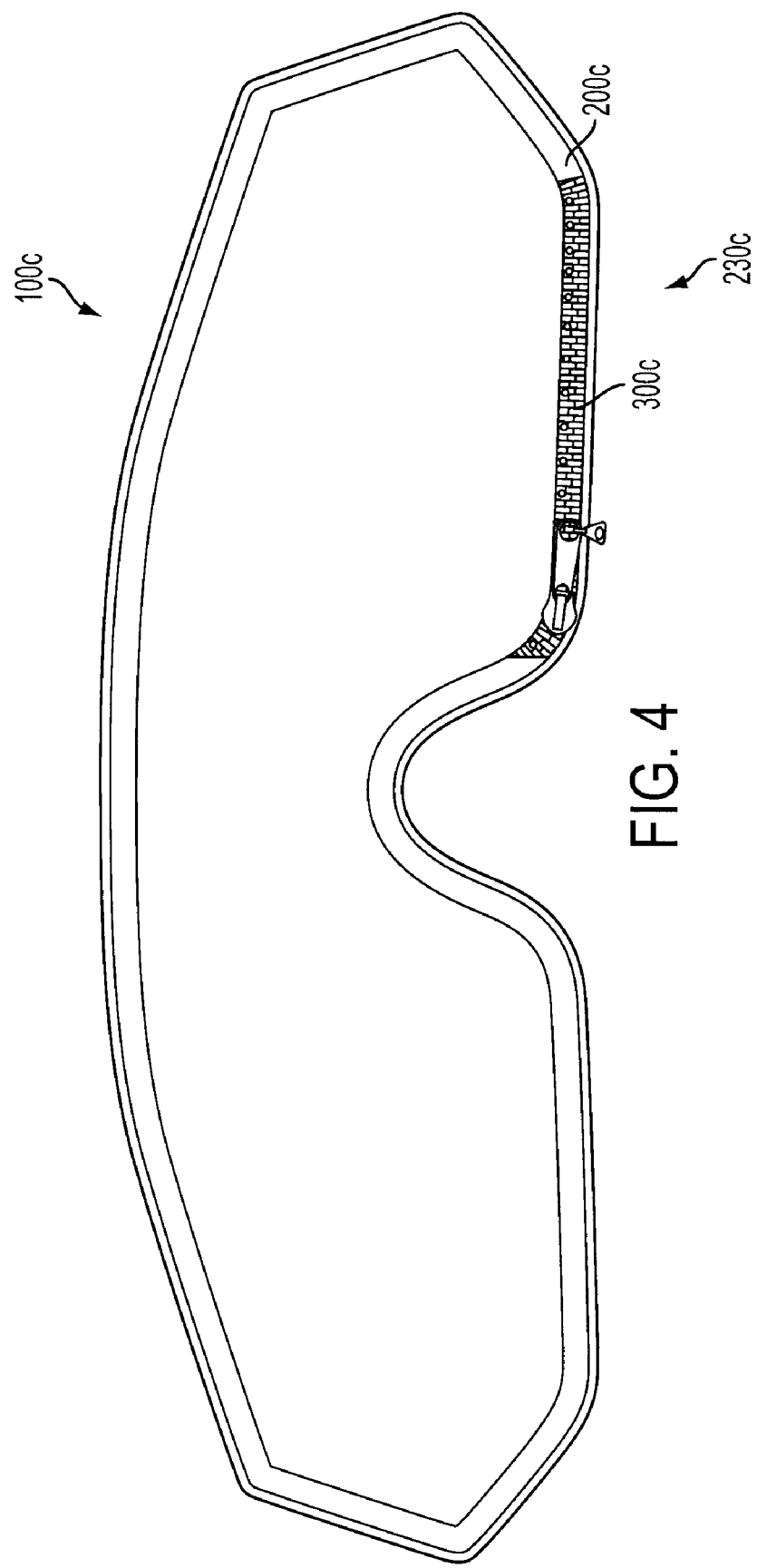
Figure 5:
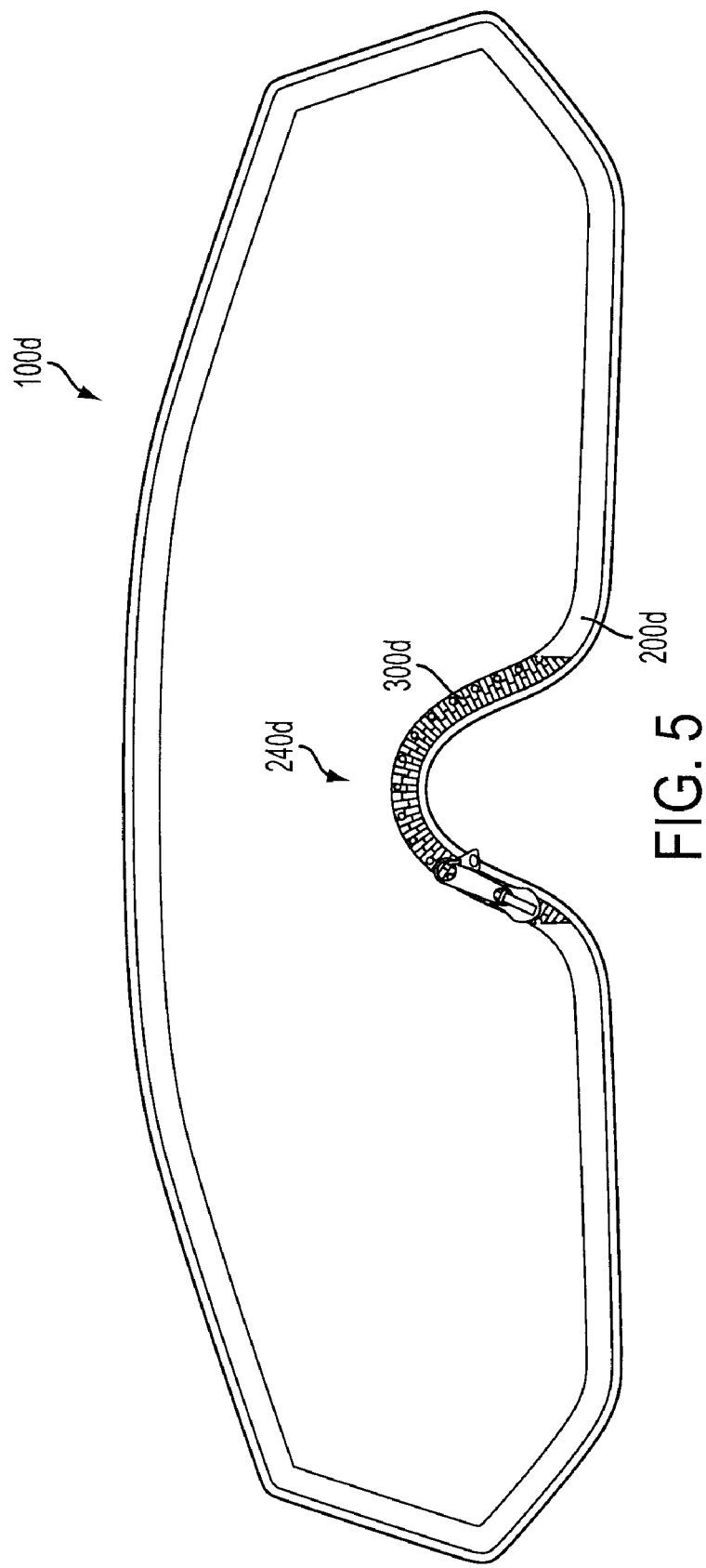
Figure 6:
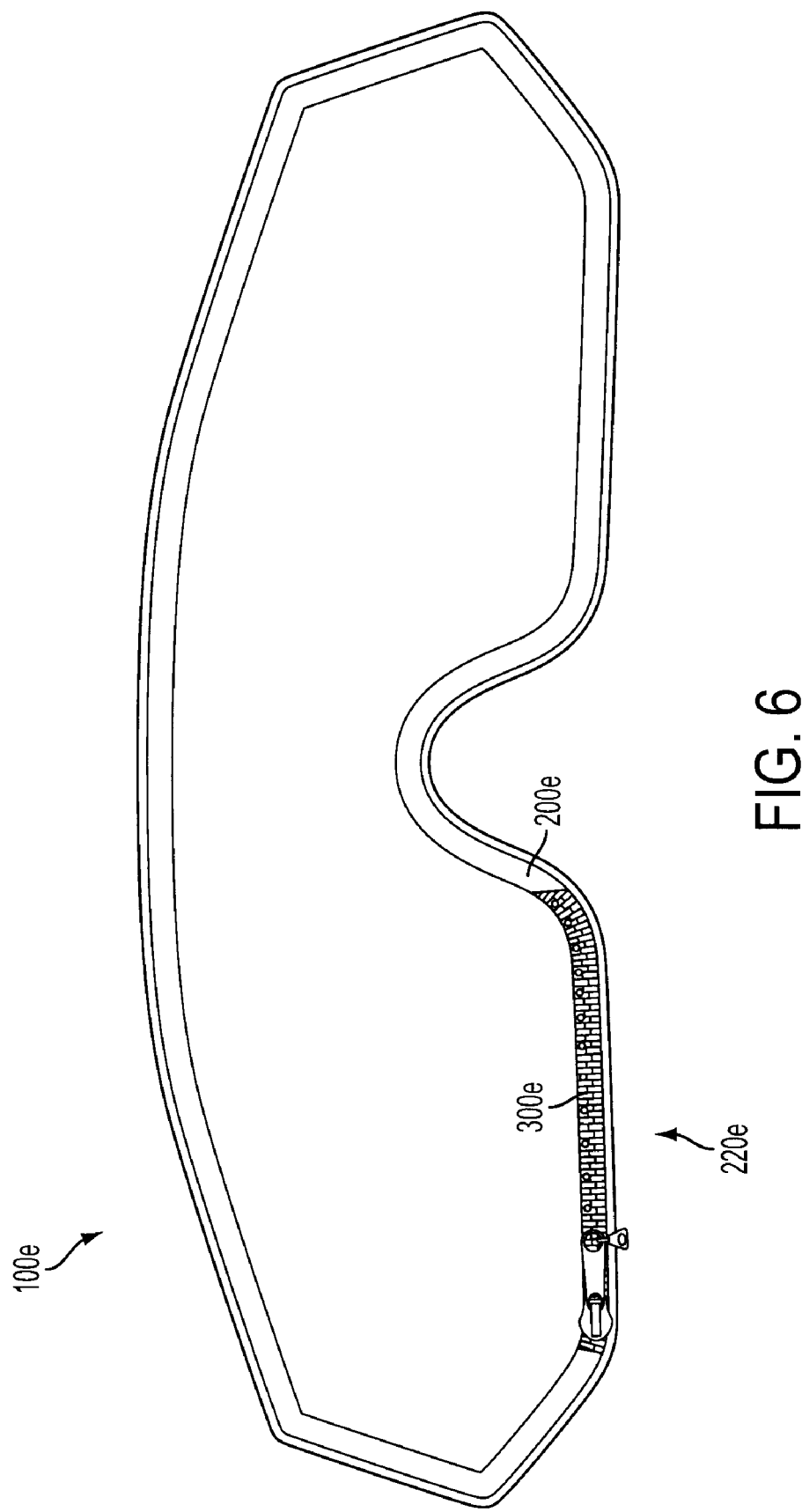
Figure 7:
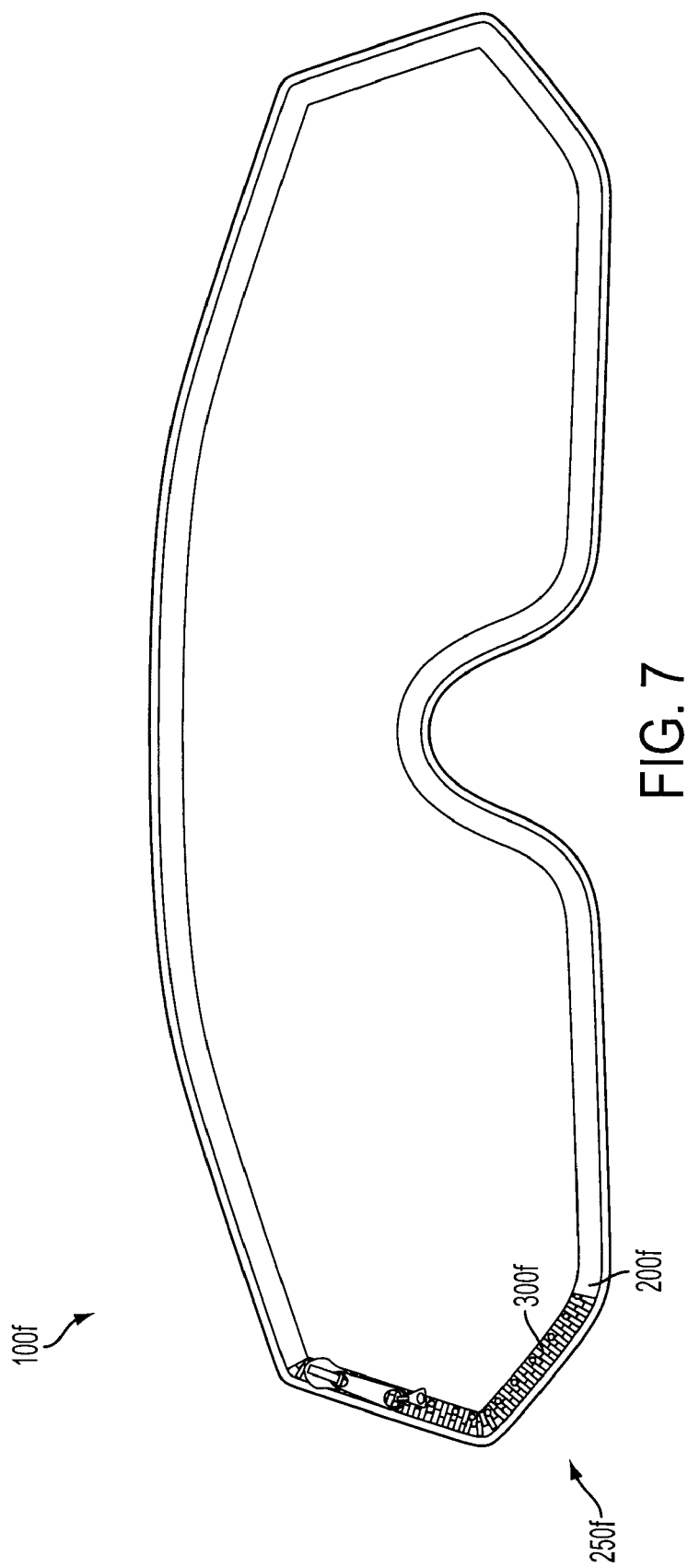
Figure 8:
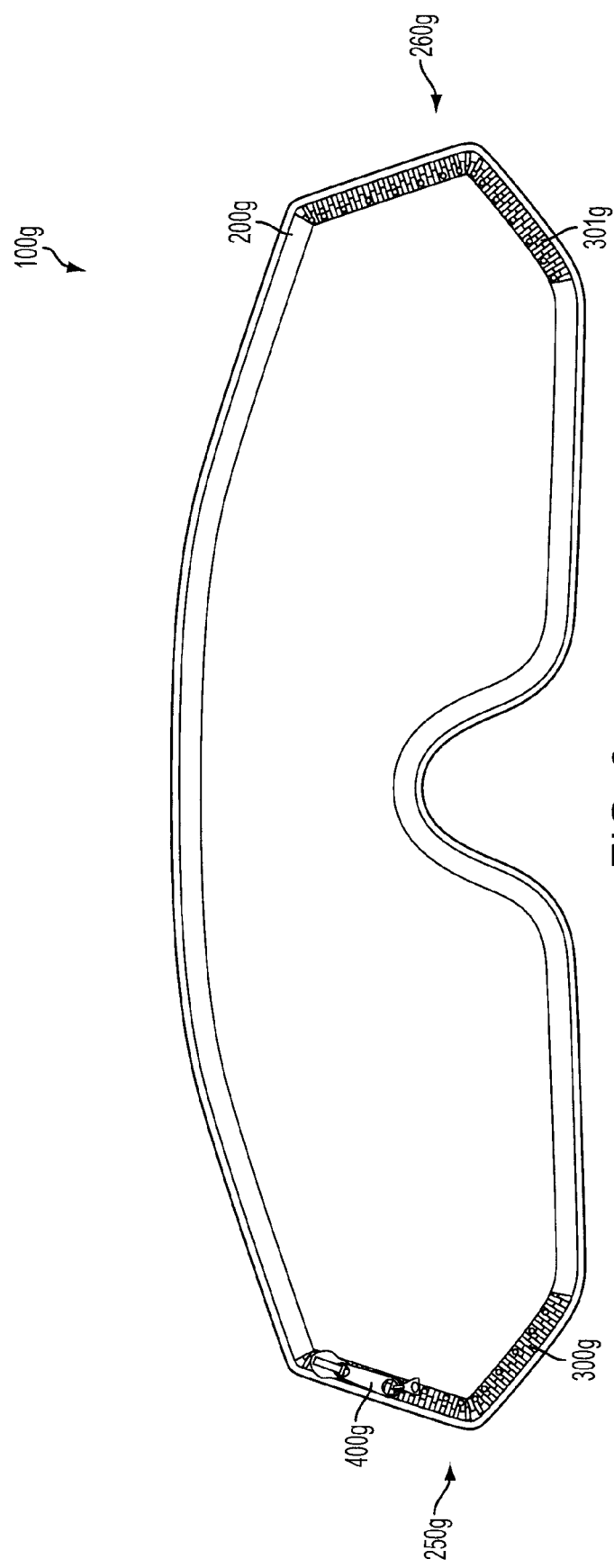
Figure 9:
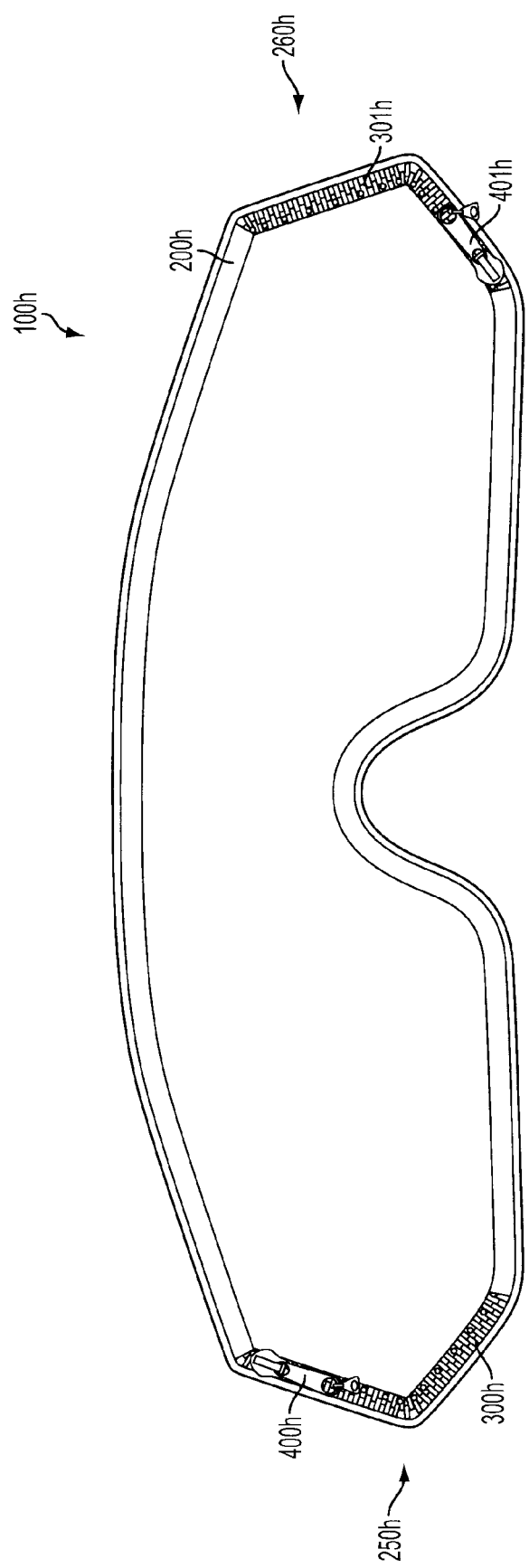

FIGS. 2-9 illustrate alternative embodiments of a frame 100 having a track only along portions of the rim portion 200. For example, FIG. 2 illustrates a frame 100a having a track 300a only along the upper portion 210a of the rim 200a. FIG. 3 illustrates a frame 100b having a track 300b only along the second side portion 260b of the rim 200b. FIG. 4 illustrates a frame 100c having a track 300c only along the second lower portion 230c of the rim 200c. FIG. 5 illustrates a frame 100d having a track 300d only along the bridge portion 240d of the rim 200d. FIG. 6 illustrates a frame 100e having a track 300e only along the first lower portion 220e of the rim 200e. FIG. 7 illustrates a frame 100f having a track 300f only along the first side portion 250f of the rim 200f. FIG. 8 illustrates a frame 100g having track portions 300g, 301g along the first and second side portions 250g, 260g of the rim 200g, with the sliding element 400g only present on one of the track portions 300g, 301g. FIG. 9 illustrates a frame 100h having track portions 300h, 301h along the first and second side portions 250h, 260h of the rim 200h, with sliding elements 400h, 401h present on both of the track portions 300h, 301h. Other track positionings are contemplated.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. A frame for eyeglasses comprising: a rim portion, a track portion comprised on at least a portion of the rim portion; and a sliding element movable on the track, wherein the sliding element further comprises a zipper slide and a pull tab.

2. The frame of claim 1, wherein the track further comprises the appearance of zipper teeth.

3. The frame of claim 1, wherein the track is provided around an entire periphery of the rim portion.

4. The frame of claim 1, further comprising a plurality of track portions provided on the rim portion.

5. The frame of claim 1, wherein the rim portion further comprises an upper portion, a first lower portion, a second lower portion, a bridge portion, a first side portion and a second side portion opposite the first side portion, and wherein the track is provided on at least one of the upper, lower or side portions of the rim portion.

6. The frame of claim 5, wherein the track is only provided on the upper portion of the rim portion.

7. The frame of claim 5, wherein the track is provided on each of the first and second lower portions of the rim portion.

8. The frame of claim 5, wherein the track is provided on each of the first and second side portions of the rim portion.

9. The frame of claim 1, wherein the track further comprises a plurality of track portions provided on the rim portion, each track portion having a sliding element positioned thereon.

10. The frame of claim 1, the track further comprising at least one opening for fixing the position of the sliding element on the track.

11. The frame of claim 10, further comprising a plurality of spaced-apart openings.

12. The frame of claim 10, wherein the sliding element further comprises a first pin for engagement with the at least one opening in the track.

13. The frame of claim 12, wherein the first pin is associated with the pull tab.

14. The frame of claim 13, further comprising a second pin extending from the pull tab.

15. A frame for eyeglasses comprising: a rim portion, a track portion comprised on at least a portion of the rim portion; and a sliding element movable on the track, wherein the track further comprises a plurality of track portions provided on the rim portion, a sliding element being positioned on at least one, but not all, of the plurality of track portions.

16. A portion of eyeglasses comprising a zipper track and a zipper slide movable on the zipper track, wherein the zipper track further comprises zipper teeth that are non-functional such that the zipper slide does not separate and join the zipper teeth during movement of the zipper slide along the zipper teeth.

17. The portion of claim 16, further comprising a plurality of openings in the zipper track for fixing the position of the zipper slide relative to the zipper track.

18. The portion of claim 17, wherein the zipper slide further comprises a pin for securing engagement with an opening in the zipper track.

* * * * *